(No Model.)
H. J. PAUSEY & C. T. CROWDEN.
VELOCIPEDE.
No. 316,649. Patented Apr. 28, 1885.
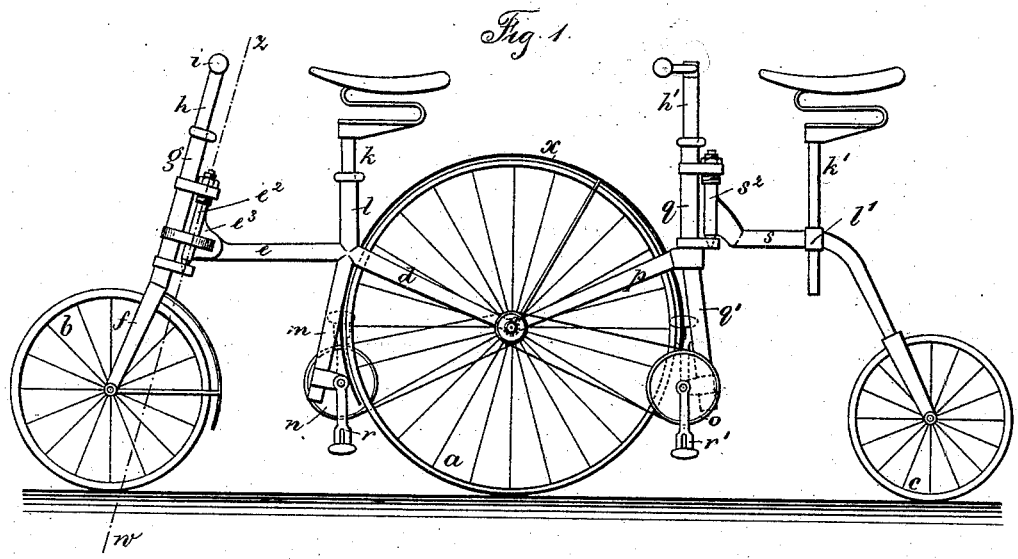
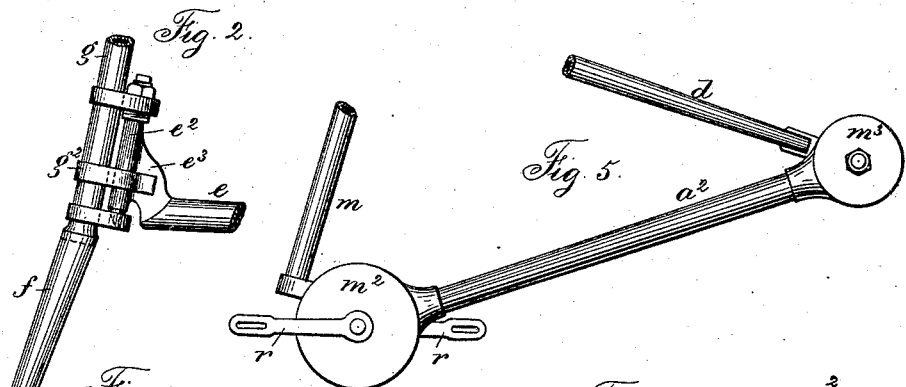
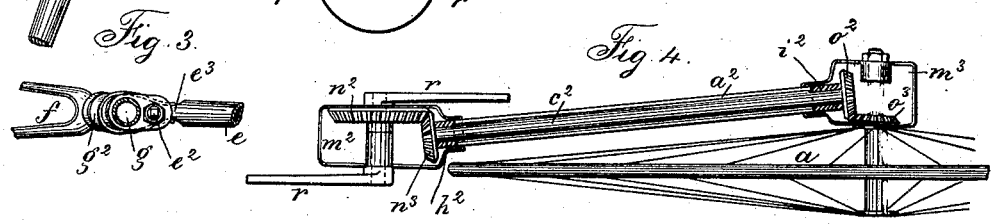
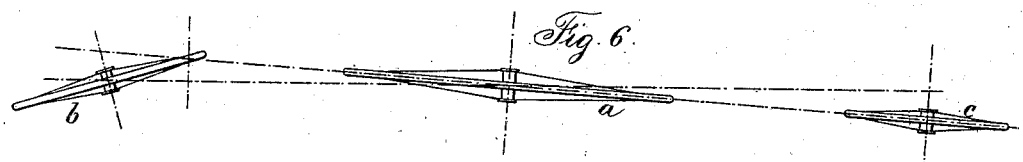
Witnesses:
J. Staib
Chas. H. Smith
Inventors
Herbert J. Pausey
Charles T. Crowden
per Lemuel W. Serrell atty

UNITED STATES PATENT OFFICE.

HERBERT JAMES PAUSEY AND CHARLES THOMAS CROWDEN, OF CLAPHAM, COUNTY OF SURREY, ENGLAND.

VELOCIPEDE.

SPECIFICATION forming part of Letters Patent No. 316,649, dated April 28, 1885.

Application filed January 10, 1885. (No model.) Patented in England September 6, 1884, No. 12,084.

*To all whom it may concern:*

Be it known that we, HERBERT JAMES PAUSEY and CHARLES THOMAS CROWDEN, subjects of the Queen of Great Britain, residing at Clapham, in the county of Surrey, England, have invented certain new and useful Improvements in Velocipedes; and we do hereby declare the following to be a full, clear, and exact description of the invention, such as will enable others skilled in the art to which it appertains to make and use the same.

The main object of this invention is to provide a safety tandem velocipede suitable for two riders of any size, low to the ground for safety, and yet capable of going at a great speed. It has three wheels—namely, a front steering-wheel, a center driving-wheel, and a trailing wheel—all secured together by suitable framing, and the framing of the trailing wheel is so arranged that the trailing wheel can adapt itself to the inequalities of the road.

The steering-wheel is pivoted to the framing, and so also is the trailing wheel, so as to facilitate the steering of the machine. Motion is transmitted from cranks fitted to the framing of the machine by an improved mud and dust proof gearing, by chains, or by suitable gearing. The machine may also be fitted with Bown's Hill-Climbing Gear or any other suitable hill-climbing gear, so that the riders, or one of them, may alter the gear from speed to power, or vice versa, while the machine is in motion. The fork of the steering-wheel is pivoted some distance behind the center of the latter, and provided with a spring to assist in keeping the wheel straight without using the handles.

In the accompanying drawings, Figure 1 is a side view of the safety tandem tricycle. Fig. 2 is a detail side view of part of the machine, showing the spring for keeping the steering-wheel straight. Fig. 3 is a plan of same. Fig. 4 is a part-sectional plan of the driving-wheel and driving-gear. Fig. 5 is a side view of the driving-gear, and Fig. 6 is a plan diagram illustrating the mode of steering.

The machine consists of a driving-wheel, $a$, which may run on a fixed pin, and is preferably surmounted by a mud-guard, $x$, secured to the frame-work in any convenient manner. The wheel $a$ is connected to the steering-wheel $b$ by the fork $d$ and backbone $e$. The fork $f$ of the steering-wheel is extended upward in the form of a tube, $g$, which contains an adjustable tube, $h$, surmounted by handles $i$, for steering and balancing the machine. The fork of the steering-wheel $b$ is pivoted to the backbone behind the center of the front wheel, so that the machine to a certain extent is steered by both the front and driving wheels, as shown by the dotted center line $w$ $z$, Fig. 1, and by Fig. 6, which is a plan diagram showing the machine when turning the corner. The rider sits on an ordinary saddle, which is fixed on any suitable spring, which is fastened to a pillar, $k$. This pillar slides telescopically in an upright tube or socket, $l$, which rises from the backbone just in front of the driving-wheel. Underneath the backbone is fixed another tube, $m$, to which is fixed the axle for the pedals $r$, which is connected to the driving-wheel by a chain or other suitable means. The rear rider, who sits over and between the driving and trailing wheels, works the machine by cranks in the same way as the front rider.

On the axle of the driving-wheel $a$ is hinged a fork, $p$, to which is fixed a tube, $q$, surmounted by a handle-bar, $h'$, which is constructed so as to be adjustable in the same way as the front one, $h$. On the tube $q$, and below the joint with the fork $p$, is fixed the chain-wheel $o$, with its cranks and pedals $r'$, from which connection is made to the driving-wheel $a$ in any suitable manner—by chain, for instance. To the tube $q$ is hinged a backbone, $s$, at the end of which there is a fork, in which the trailing-wheel $c$ is secured in the ordinary manner. The backbone $s$ is provided with a socket, $l'$, for an adjustable saddle-bar, $k'$, as shown.

Figs. 2 and 3 show in side view and plan, respectively, the spring arrangement for assisting the steering and keeping the machine in a straight line when running without the handles, consisting of a flat steel spring, $g^2$, fixed to the steering-tube $g$, grasping the neck $e^3$ of the backbone $e$. The same object may be attained by the use of spiral or rubber springs.

Instead of transmitting the power from the cranks to the driving-wheel axle by endless chains or bands, we may obviously employ tooth-wheel gearing—such, for instance, as shown in plan and side view in Figs. 4 and 5—which, moreover, is inclosed to exclude dust, wet, and mud. The bevel-wheels $n^2$ $n^3$ and $o^2$ $o^3$ are four bevel-wheels, which are inclosed in two boxes, $m^2$ and $m^3$, connected together by a light tube, $a^2$, following the angle of the spokes of driving-wheel $a$, so as to keep the crank-axles as short as possible on the front and trailing wheels. The tube $a^2$ carries an intermediate shaft, $c^2$, which works in bearings $h^2$ and $i^2$, and at each end has the bevel-wheels $n^3$ and $o^2$. Motion is also communicated from the rear rider to the driving-wheel in the same manner, except that the gear is on the other side of the wheel $a$. It must be observed that the forks $d$ and $p$ are not in one, but independent of each other, and both pivoting around the center of the driving-wheel $a$, so that the wheels $a$, $b$, and $c$ are free to pass over inequalities of the road without affecting each other.

If the machine is occasionally required to be used for only one person, the trailing wheel and its framing can be easily disconnected from the axle of the driving-wheel; or the steering-wheel (with its frame) and the trailing wheel, (with its frame,) or either of them, may be disconnected for the purpose of facilitating packing and transport.

We claim—

1. A one-track velocipede adapted for two tandem riders, and having a center driving-wheel, $a$, a front steering-wheel, $b$, and a trailing wheel, $c$, the pin or spindle for the driving-wheel $a$ being mounted in two forks, $d$ and $p$, which are free to turn or pivot independently of each other, the fork $d$ forming part of the front framing consisting of the upright member $l$, which receives the adjustable front seat-bar or pillar, $k$, of the descending member $m$, which carries the bearing for the low or safety front crank and pedals, and driving-gear which transmits motion to the driving-wheel $a$, and of the backbone $e$, the neck $e^3$ of which is pivoted to the fork $f$, which carries the front steering-wheel, $b$, and the adjustable steering-handle $h$, the center line through the pivoting bolt or centers falling behind the center of the steering-wheel $b$, and the aforesaid fork $p$ forming part of the back framing consisting of the upright member $q$, which receives the adjustable steadying-handle $h'$ for the hind rider, and of the descending member $q'$, which carries the bearing for the low or safety rear crank and pedals, and driving-gear which transmits motion to the driving-wheel $a$, the said member $q$ having pivoted to it the backbone $s$, with adjustable seat-bar $k'$, and the fork for the trailing wheel $c$, tooth-wheel or other gear being provided for transmitting the motion from the front crank and from the rear crank to the driving-wheel, all substantially as set forth.

2. In a one-track velocipede, the frame $e$ $l$ $m$ $d$, provided with the adjustable seat-bar $k$, crank-bearing with low or safety crank and pedals, and pivot $e^2$, in combination with the fork $f$, pivoted thereto, and adapted to receive front steering-wheel having its center in advance of the center line through the pivot $e^2$, and adapted to receive an adjustable handle, $h$, the part $d$ of the frame being forked and adapted to receive the main or driving wheel spindle, and in combination with driving-gear for transmitting the motion from the crank to the driving-wheel, substantially as set forth.

3. In a one-track velocipede, the frame $q$ $q'$, provided with the adjustable handle $h'$, crank-bearing with low or safety crank and pedals, and pivot $s^2$, in combination with the fork $p$, connecting the frame $q$ $q'$ to the axle of the driving-wheel, the backbone $s$ and adjustable seat-bar $k'$, the fork and trailing wheel, and driving-gear for transmitting the motion from the crank to the driving-wheel, substantially as set forth.

4. In a one-track velocipede, the frame $e$ $l$ $m$, provided with the crank-bearing with low or safety crank and pedals, in combination with the bevel-wheel $n^2$ on said crank, and with the bevel-wheel $n^3$, spindle $c^2$, and bevel-wheel $o^2$, which gears with a bevel-wheel, $o^3$, on the driving-wheel, and with the box or boxes $m^2$ $a^2$ $m^3$, inclosing said gear, substantially as set forth.

HERBERT JAMES PAUSEY.
CHARLES THOMAS CROWDEN.

Witnesses:
JNO. DEAN,
T. J. OSMAN,
*Both of 17 Gracechurch Street, London.*